Nov. 10, 1936.　　　O. E. RARICK　　　2,060,439

TWO-WAY TRACTOR PLOW

Filed June 30, 1936　　　3 Sheets-Sheet 1

Inventor

Orth E. Rarick

By Clarence A. O'Brien
Hyman Berman
Attorneys

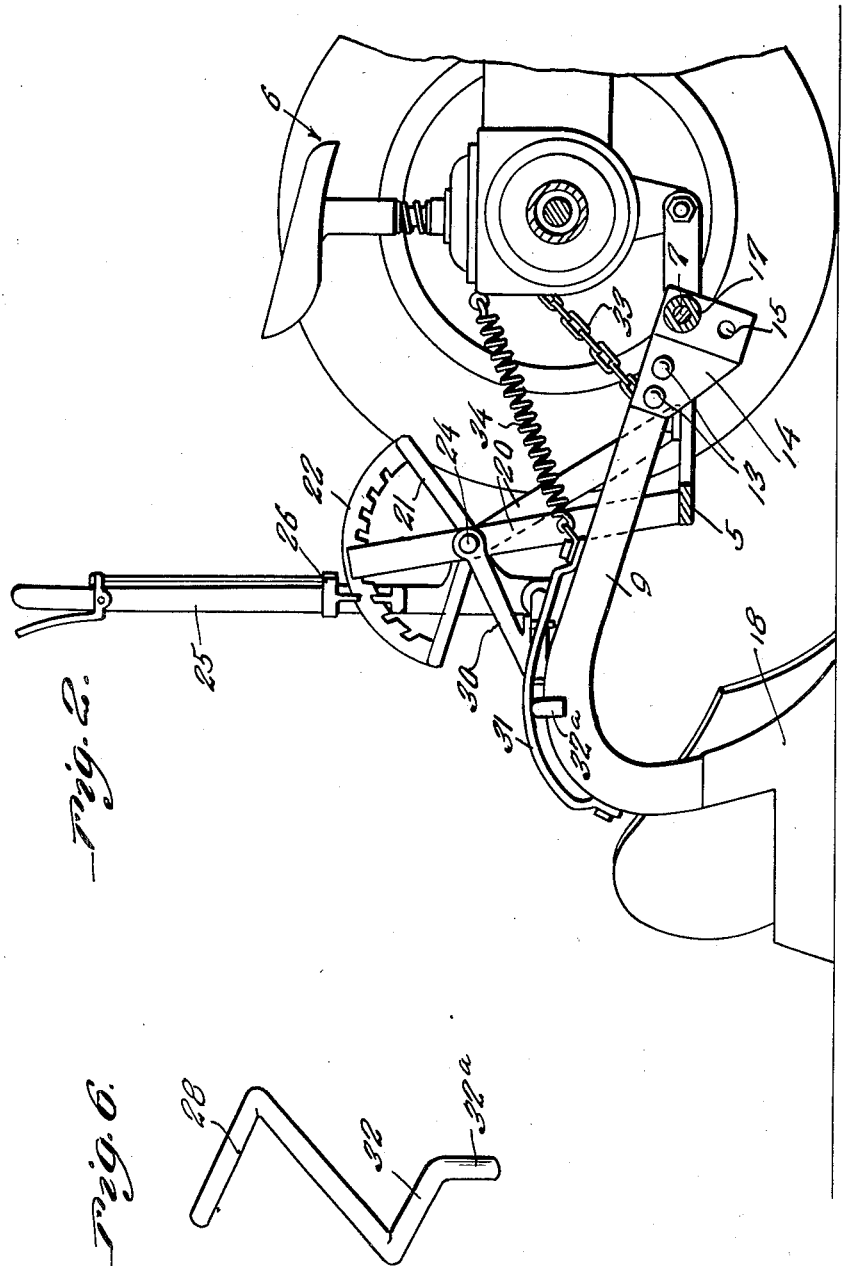

Nov. 10, 1936.　　O. E. RARICK　　2,060,439
TWO-WAY TRACTOR PLOW
Filed June 30, 1936　　3 Sheets-Sheet 3
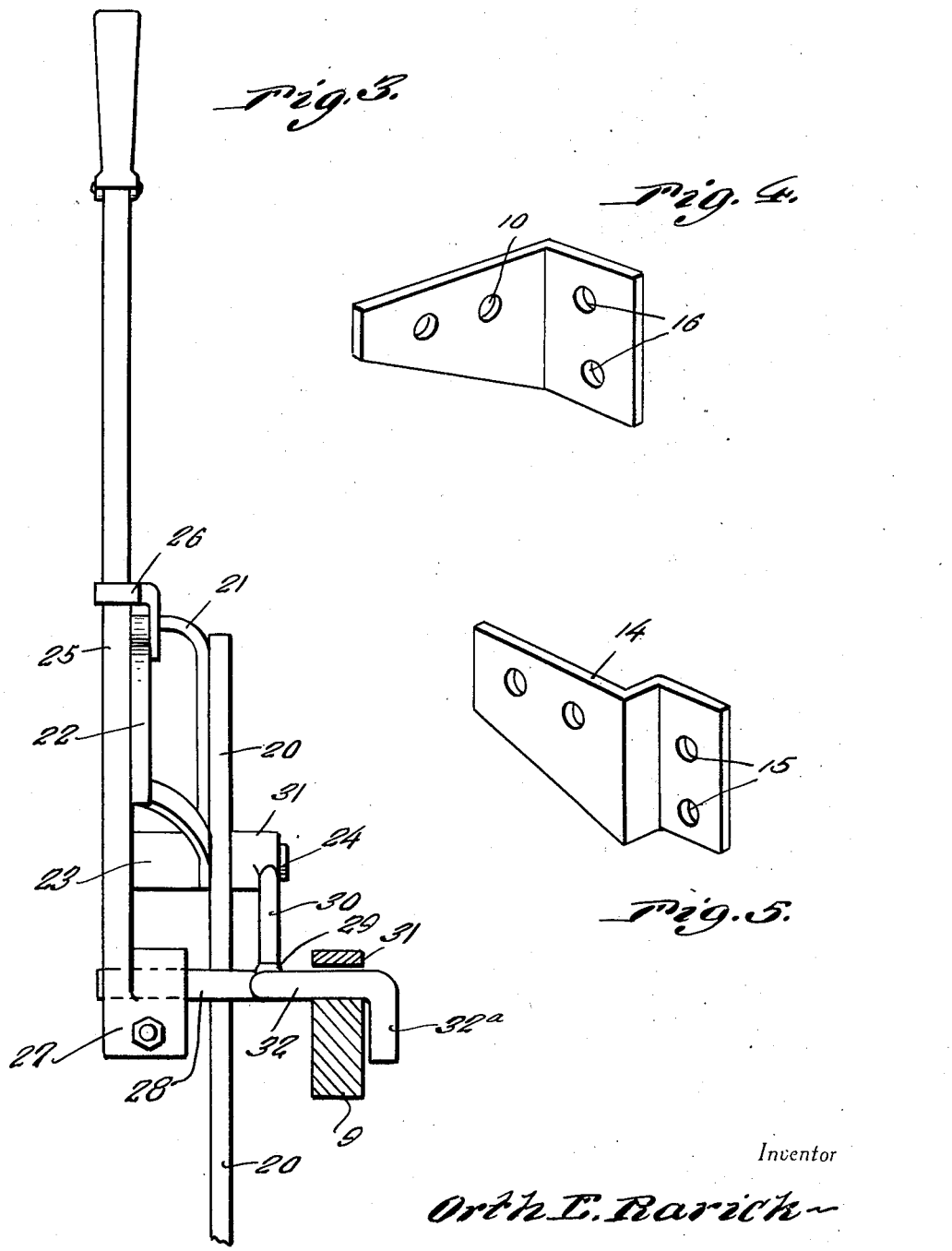
Inventor
Orth E. Rarick
By Clarence A. O'Brien
Hyman Berman
Attorneys Patented Nov. 10, 1936

2,060,439

UNITED STATES PATENT OFFICE 2,060,439

TWO-WAY TRACTOR PLOW

Orth E. Rarick, Eagle, Idaho, assignor, by direct and mesne assignments, to Eagle Manufacturing Company, Caldwell, Idaho, a corporation of Idaho Application June 30, 1936, Serial No. 88,244

3 Claims. (Cl. 97—47)

This invention relates to wheel plows of the two-way or hillside type and the object of the invention is to provide such a plow as can be readily connected with the draft bar of farm tractors.

The invention together with its objects and advantages will be best understood from a study of the following description taken in connection with the accompanying drawings wherein:—

Figure 2 is a vertical sectional view further illustrating the application of the invention.

Figure 3 is a detail sectional view taken substantially on the line 3—3 of Figure 1.

Figures 4 and 5 are perspective views of brackets forming part of the invention and Figure 6 is a perspective view of an angular lever forming part of the invention.

Figure 1:
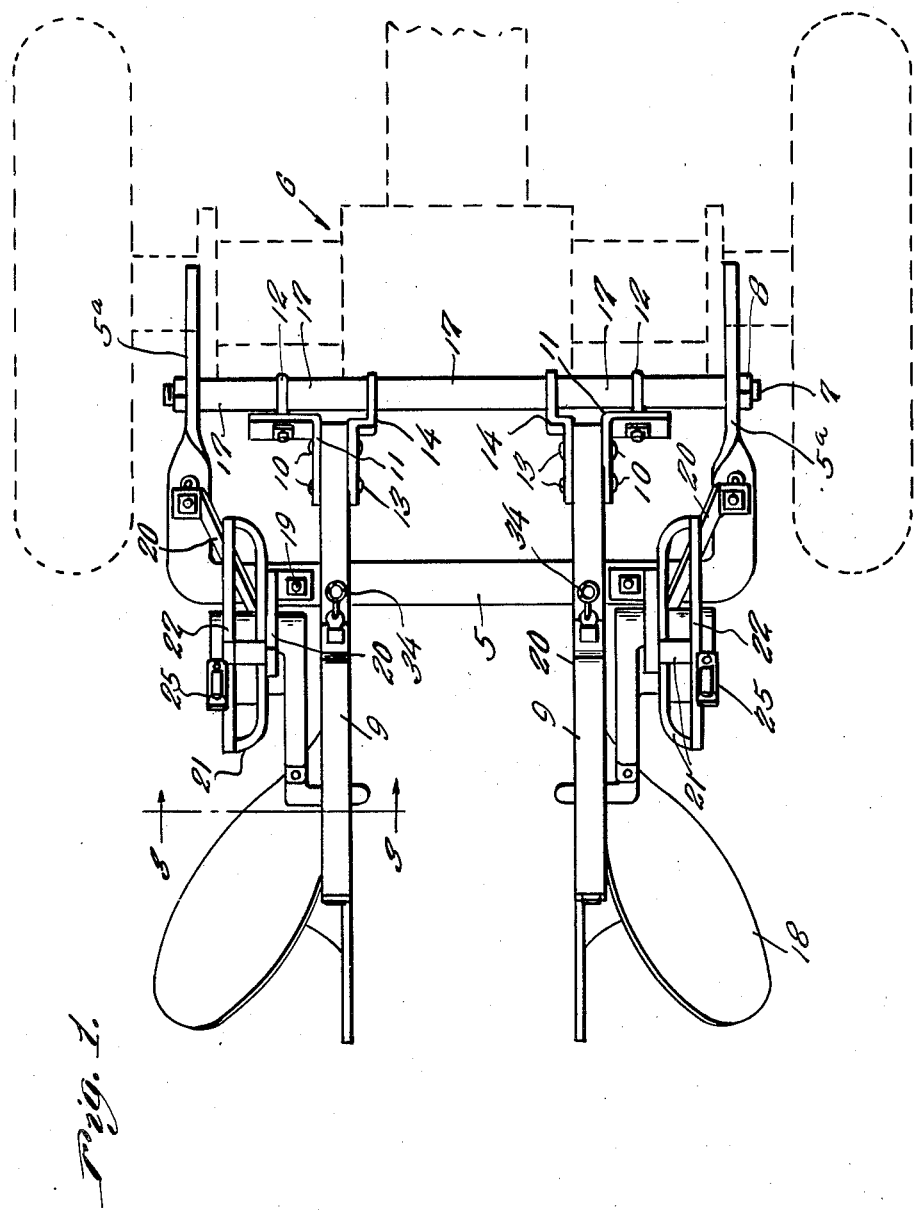
Figure 1 is a top plan view of a plow constructed in accordance with the present invention and showing the manner of attaching the same to the draw bar of a tractor.

Referring to the drawings by reference numerals it will be seen that the numeral 5 indicates generally the conventional draw bar of a conventional farm tractor, which latter is indicated generally by the reference numeral 6.

In accordance with the present invention the opposite side portions 5a of the draw bar 5 are connected by a rod or bolt 7 equipped on the respective opposite ends thereof with nuts 8 for securing the bolts in position.

Further in accordance with the present invention there is provided a pair of plow beams 9 and each plow beam has secured at one end thereof, and to one side thereof as at 10, one arm of a substantially L-shaped bracket 11, the other arm of which is secured to the rod 7 through the medium of an eye bolt 12, rod 7 passing through the eye of the bolt 12 as is thought to be apparent.

Also secured to each beam 8 at the last mentioned end thereof, and at the side thereof opposite the bracket 11, and as at 13 is one end portion of a substantially S-shaped bracket 14 (see Figure 5) which at its free end is provided with a pair of openings 15 through a selected one of which the shaft 7 extends. In this connection it will be also noted that the arm of the bracket 10 that is engaged by the eye bolt 12 is also provided with a pair of openings 16 through which a selected one of which the shank of the bolt 12 passes. Thus it will be seen that providing a pair of openings 16 in the bracket 10 and a pair of openings 15 in the bracket 14 provision is made for securing each of the plow beams 9 to the rods or shafts 7 at the desired adjustment.

For holding the beams 9 in proper spaced relation there are provided on the rod 7 spacer sleeves 17 these sleeves being arranged in alternate relation to the eye bolts 12 and brackets 14 as shown in Figure 1.

On the free end thereof each of the beams 9 is provided with the usual plow 18.

Also in accordance with the present invention there is suitably mounted as at 19 on the draft beam 5 adjacent each side of the latter a bracket plate 20 which has extending from one side thereof arms 21 that are integral with a rack segment 22. (See Figures 1 and 3).

Each bracket 20 is also provided with a bearing 23 in which is journaled a pin 24 on one end of which is provided a hand lever 25. Hand lever 25 is provided with a suitable detent structure 26 cooperable with the adjacent rack segment 22 for holding the lever 25 at the desired adjustment.

On the lower end thereof each hand lever 25 is provided with a split clamp 27 through the medium of which one end 28 of an angular shaped arm 29 is secured to said end of the lever 25. The intermediate portion of the arm 29 has bolted or otherwise secured thereto an arm 30 formed integral with a sleeve or hub member 31 supported by the pin 24.

The free end 32 of the member 29 operates between the upper edge of an adjacent plow beam 9 and a guide strap 33 secured at its respective opposite ends to the beam 9 and having its intermediate portions spaced from the beam 9 as shown in Figure 5. Said end 32 of the member 29 has a downturned projection 32a disposed at the side of the beam 9 opposite to the bracket 20. (See Figures 1 and 3.)

From the above it will be seen that by rocking a lever 25 member 29 will move therewith so that with the end 32 of the member 29 engaging the guide strap 31 plow beam 9 will be caused to raise or lower as found desirable and will be held at the desired adjustment effected by the proper adjustment of the lever 25.

For limiting downward swinging movement of the draw bar 9 which, it will be understood, is pivoted to the tractor there are provided suitable chains 33 as clearly shown in Figure 2. By substituting the chains 33 for the usual angle iron braces provided for the draw bar it will be seen that the tractor wheels will be permitted to drop into holes, depressions or the like without affecting the digging depths of the plows 18.

For yieldably urging the plow beams 9 to swing vertically upwardly there are provided for the plow beams springs 34 which are suitably anchored at one end to the plow beams 9 intermediate the ends of the respective beams, while at a relatively opposite end each spring 34 is suitably anchored to a fixed part of the tractor as shown in Figure 2.

It will be seen by the above description that I have provided a simple and efficient two-way plow attachment for tractors and which attachment can be readily applied to the draw bar of the tractor without altering materially the structure of the tractor or the draw bar.

It will be further seen that each plow may be adjusted and regulated relative to the ground independently of one another by the adjustment of the selected lever 25 by which the associated plow beam may be raised or lowered as found desirable.

Having thus described the invention what is claimed as new is:—

1. In combination with a tractor having a draw bar pivoted thereto and chains connected at one end with the tractor and at the relatively opposite end with the draw bar; of a rod extending between and supported by opposite sides of the draw bar, a pair of plow beams, each of said beams being pivotally connected at one end with said rod, a pair of bracket members secured to and rising from the draw bar, there being one bracket member for each plow beam, a rack segment supported by said bracket, a hand lever pivotally mounted on said bracket and provided with a detent structure cooperable with the rack segment for holding the lever at the desired adjustment, and inter-engaging means on the lever and an adjacent plow beam for transmitting movement of the lever to the plow beam for securing the latter at the desired adjustment.

2. In combination with a tractor having a draw bar, of a rod extending between and supported by the opposite sides of the draw bar, a plow beam, a bracket member secured to one side of the plow beam at one end of the latter, an eye bolt engaged with said rod and said bracket, a second bracket secured to said end of the plow beam at the side thereof opposite to the first bracket, said second bracket having an apertured part through which said rod extends for cooperation with the eye bolt to pivotally connect said end of the beam with said rod, a bracket secured to and rising from the draw bar, a rack segment on said last mentioned bracket, a hand lever pivotally mounted on the last mentioned bracket and provided with a detent structure cooperable with said segment for securing the hand lever at the desired adjustment, a guide strap secured to said beam and having its intermediate portion spaced from the top edge of the beam, and an arm secured at one end to the lower end of said lever and having a free end extending between the intermediate portion of said guide strap and said beam and engageable with the guide strap for transmitting movement of the lever to the beam.

3. In combination with a tractor having a draw bar, of a rod extending between and supported by the opposite sides of the draw bar, a plow beam, a bracket member secured to one side of the plow beam at one end of the latter, an eye bolt engaged with said rod and said bracket, a second bracket secured to said end of the plow beam at the side thereof opposite to the first bracket, said second bracket having an apertured part through which said rod extends for cooperation with the eye bolt to pivotally connect said end of the beam with said rod, a bracket secured to and rising from the draw bar, a rack segment on said last mentioned bracket, a hand lever pivotally mounted on the last mentioned bracket and provided with a detent structure cooperable with said segment for securing the hand lever at the desired adjustment, a guide strap secured to said beam and having its intermediate portion spaced from the top edge of the beam, and an arm secured at one end to the lower end of said lever and having a free end extending between the intermediate portion of said guide strap and said beam and engageable with the guide strap for transmitting movement of the lever to the beam, and a spring anchored at one end to the tractor and at a relatively opposite end to an intermediate portion of said beam for normally urging the beam upwardly.

ORTH E. RARICK.